(12) United States Patent
Abe et al.

(10) Patent No.: US 11,061,393 B2
(45) Date of Patent: Jul. 13, 2021

(54) CONSOLIDATING ANOMALY ROOT CAUSES AND ALARMS USING GRAPHICAL GRANGER MODELS

(71) Applicant: International Business Machines Corporation, Armonk, NY (US)

(72) Inventors: Naoki Abe, Rye, NY (US); Kimberly C. Lang, Yorktown Heights, NY (US); Jinwoo Shin, Daejeon (KR)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 16/554,553

(22) Filed: Aug. 28, 2019

(65) Prior Publication Data

US 2021/0067401 A1    Mar. 4, 2021

(51) Int. Cl.

| G05B 23/02 | (2006.01) |
|---|---|
| H04L 12/24 | (2006.01) |
| H04L 12/26 | (2006.01) |
| G05B 13/04 | (2006.01) |
| G06F 11/07 | (2006.01) |

(Continued)

(52) U.S. Cl.
CPC ......... *G05B 23/0275* (2013.01); *G05B 13/04* (2013.01); *G05B 13/041* (2013.01); *G05B 23/0205* (2013.01); *G05B 23/0283* (2013.01); *G06F 11/079* (2013.01); *G06F 11/14* (2013.01); *H04L 1/242* (2013.01); *H04L 41/064* (2013.01); *H04L 41/069* (2013.01); *H04L 41/0622* (2013.01); *H04L 43/16* (2013.01)

(58) Field of Classification Search
CPC . H04L 41/0622; H04L 41/064; H04L 41/069; H04L 43/16; G05B 23/0275
USPC ....................................................... 709/224
See application file for complete search history.

(56) References Cited

U.S. PATENT DOCUMENTS

| 6,446,123 B1 * | 9/2002 | Ballantine ............... H04L 41/06 |
| | | 709/224 |
| 7,096,074 B2 | 8/2006 | Yulevitch et al. |

(Continued)

OTHER PUBLICATIONS

Qiu et al., Granger Causality for Time-Series Anomaly Detection, 2012 IEEE 12th International Conference On Data Mining, 1074-79 (2012) (Year: 2012).*

(Continued)

*Primary Examiner* — David P Zarka
(74) *Attorney, Agent, or Firm* — Daniel Morris; Otterstedt, Wallace & Kammer, LLP

(57) ABSTRACT

A method for anomaly alarm consolidation includes detecting a plurality of anomalies in time-series data received from an information technology infrastructure; identifying a plurality of root-cause candidates for each of the anomalies; generating, by a scenario analysis of the anomalies, a plurality of alarms, wherein the scenario analysis predicts a plurality of future expected values of the time-series data over a plurality of historical values of the time-series data using a graphical Granger causal model and generates the alarms based on a difference between the future expected values of the time-series data and actual values of the anomalies in the time-series data; and performing a belief propagation procedure between the root-cause candidates and the alarms to determine a plurality of root-causes that collectively comprise attributed root-causes for the alarms.

8 Claims, 9 Drawing Sheets

---

Group Graphical Granger Modeling

1. Input: Time series data $X_1 = \{X_1(t)\}_{t=1}^T$, $X_2 = \{X_2(t)\}_{t=1}^T$, ..., $X_n = \{X_n(t)\}_{t=1}^T$, and a regression method with group variable selection, REG.

2. Initialize the casual (directed) graph for the n features, i.e. $G = (V,E)$ where $V = \{1,2,...,n\}$ and $E = 0$.

3. For each feature $X_i \in V$, run REG on regressing for $X_i(t)$ in terms of the past lagged variables, $X_j(t-1), ..., X_j(t-d)$, for every the feature $X_j$ (including $X_i$) i.e., regress $(X_i(T), X_i(T-1), ..., X_i(1+d))$ in terms of $$\begin{pmatrix} X_1(T-1) & \cdots & X_1(T-d) & \cdots & X_n(T-1) & \cdots & X_n(T-d) \\ X_1(T-2) & \cdots & X_1(T-1-d) & \cdots & X_n(T-2) & \cdots & X_n(T-1-d) \\ \vdots & & \vdots & & \vdots & & \vdots \\ X_1(d) & \cdots & X_1(1) & \cdots & X_n(d) & \cdots & X_n(1) \end{pmatrix}$$

4. For each feature $X_i$ place an edge $(j, i)$ into E, if and only if $X_j$ was selected as a group by the grouped variable selection method REG.

(51) Int. Cl.
*G06F 11/14* (2006.01)
*H04L 1/24* (2006.01)

(56) References Cited

U.S. PATENT DOCUMENTS

| | | | |
|---|---|---|---|
| 8,694,836 | B2 | 4/2014 | Lapiotis et al. |
| 8,700,761 | B2 | 4/2014 | Bajpay et al. |
| 9,026,855 | B2 | 5/2015 | Sharma et al. |
| 9,037,896 | B2 | 5/2015 | Addepalli et al. |
| 9,961,571 | B2 * | 5/2018 | Yang ............... H04W 24/04 |
| 10,038,618 | B2 | 7/2018 | Bell et al. |
| 10,075,356 | B2 * | 9/2018 | Pei ................. H04L 41/0618 |
| 10,360,527 | B2 * | 7/2019 | Abe .................. G06Q 10/067 |
| 10,373,094 | B2 * | 8/2019 | Naous ............... G06Q 10/067 |
| 10,574,512 | B1 * | 2/2020 | Mermoud .......... H04L 41/0636 |
| 2007/0028220 | A1 | 2/2007 | Miller et al. |
| 2011/0275364 | A1 * | 11/2011 | Austin ................ H04L 41/12 455/423 |
| 2015/0074035 | A1 * | 3/2015 | Narasappa ............ G06N 7/005 706/52 |
| 2019/0196894 | A1 * | 6/2019 | Cherbakov ......... H04L 43/0864 |

OTHER PUBLICATIONS

Lozano et al., Grouped graphical Granger modeling for gene expression regulatory networks discovery, Bioinformatics, 110-18 (2009) (Year: 2009).*
Lozano et al., Grouped Graphical Granger Modeling Methods for Temporal Causal Modeling, 577-85 (2009) (Year: 2009).*
Lozano et al., Spatial-temporal Causal Modeling for Climate Change Attribution, KDD'09, 1-9 (2009) (Year: 2009).*
Arnold et al., Temporal Causal Modeling with Graphical Granger Methods, KDD'07, 1-10 (2007) (Year: 2007).*
Chvatal, A greedy heuristic for the set-covering problem, Mathematics of Operations Research, 233-35, (1979) (Year: 1979).*
Lin, et al. Automated anomaly detection and root cause analysis in virtualized cloud infrastructures. In Network Operations and Management Symposium (NOMS), 2016 IEEE/IFIP, Apr. 2016, pp. 550-556. IEEE.
Glymour, Discovering causal structure: artificial intelligence, philosophy of science and statistical modeling. Jan. 1986, pp. i-iv and 1-396.
Lozano et al., "Grouped graphical Granger modeling for gene expression regulatory networks discovery", Bioinformatics, vol. 25, Issue 12, Jun. 15, 2009, pp. i110-i118.
Chvatal, "Greedy set-covering problems," Encyclopedia of Algorithms, Aug. 2008, pp. 379-382.
Arnold et al. Temporal Causal Modeling with Graphical Granger Methods, KDD'07 Aug. 12-15, 2007, pp. 1-10 San Jose, California, USA.
V. Chvatal, A Greedy Heuristic for the Set-Covering Problem. Mathematics of Operations Research 4(3), Aug. 1979, pp. 233-235.

* cited by examiner

Group Graphical Granger Modeling

1. Input: Time series data $X_1 = \{X_1(t)\}_{t=1}^T$, $X_2 = \{X_2(t)\}_{t=1}^T, ..., X_n = \{X_n(t)\}_{t=1}^T$, and a regression method with group variable selection, REG.

2. Initialize the casual (directed) graph for the n features, i.e. $G = (V,E)$ where $V = \{1,2, ..., n\}$ and $E = 0$.

3. For each feature $X_i \in V$, run REG on regressing for $X_i(t)$ in terms of the past lagged variables, $X_j$ (t-1), ..., $X_j$(t-d), for every the feature $X_j$ (including $X_i$) i.e., regress $(X_i(T), X_i(T-1), ..., X_i(1+d))$ in terms of $$\begin{pmatrix} X_1(T-1) & \cdots & X_1(T-d) & \cdots & X_n(T-1) & \cdots & X_n(T-d) \\ X_1(T-2) & \cdots & X_1(T-1-d) & \cdots & X_n(T-2) & \cdots & X_n(T-1-d) \\ \vdots & \vdots & \vdots & \vdots & \vdots & \vdots & \vdots \\ X_1(d) & \cdots & X_1(1) & \cdots & X_n(d) & \cdots & X_n(1) \end{pmatrix}$$

4. For each feature $X_i$ place an edge (j, i) into E, if and only if $X_j$ was selected as a group by the grouped variable selection method REG.

FIG. 1

| TimeStamp | KPI | Name | ParentAlarm |
|---|---|---|---|
| 1345077000000 | 10080 | "Node2:Env3-Query_Rate" | 10104 |
| 1345077000000 | 10107 | "Node2:Env1-Total_Wait_Time" | 10554 |
| 1345077000000 | 10081 | "Node2:Env3-Connection_Max_Wait_Time" | 10104 |
| 1345077000000 | 10554 | "Node2:Database-Average_Usage_Time" | 10107 |
| 1345077000000 | 10104 | "Node2:Env1-Connection_Max_Wait_Time" | 10554 |
| 1345077000000 | 3318 | "Node2:Env1-Method_Invocation_Rate" | 10554 |
| 1345077000000 | 3317 | "Node2:Env1-Method_Invocation" | 10554 |
| 1345077000000 | 13238 | "Node2:Env7-Connection_Max_Wait_Time" | 10104 |
| 1345077000000 | 10791 | "Node1:Database-Average_Pool_Size" | 10104 |
| 1345077000000 | 13241 | "Node1:Env7-Total_Wait_Time" | 10104 |
| 1345077000000 | 13005 | "Node1:Env6-Connection_Max_Wait_Time" | 10554 |
| 1345077000000 | 10556 | "Node2:Database-Average_Pool_Size" | 10104 |
| 1345077000000 | 3193 | "Node1:Env1-Method_Invocations" | 10107 |
| 1345077000000 | 3004 | "Node2:Env1-Method_Invocations" | 10554 |
| 1345077000000 | 10789 | "Node1:Database-Average_Usage_Time" | 10104 |
| 1345077000000 | 13008 | "Node1:Env6-Total_Wait_Time" | 10554 |
| 1345077000000 | 3194 | "Node1:Env1-Method_Invocation_Rate" | 10554 |
| 1345077000000 | 10103 | "Node2:Env1-Query_Rate" | 10104 |
| 1345077000000 | 10084 | "Node2:Env3-Total_Wait_Time" | 10107 |
| 1345077000000 | 3005 | "Node2:Env1-Method_Invocation_Rate" | 10107 |

CONSOLIDATING ANOMALY ROOT CAUSES AND ALARMS USING GRAPHICAL GRANGER MODELS

The present disclosure relates generally to anomaly detection on time-series data and more particularly to detection of anomalies, attribution of their root causes, and consolidation of their alarms in Information Technology (IT) and other domains.

Generally, time-series data can be considered as a sequence of data points (e.g., arrays of numbers), measuring one or more variables over time, and stored or indexed in time order. The data can be paired with a timestamp. Since time-series data can be considered to be a series of inserts to a database, the data can accumulate quickly over time, such that typical databases cannot handle the scale.

Anomaly detection on time-series data is a topic that has attracted considerable attention in the data mining community, and its many application areas. A number of studies have been conducted in the recent years, with varying approaches including parametric modeling, pattern mining, clustering, change point detection, classification and others. Most research works to date, however, have focused on the question of accuracy in detecting outliers and change points present in time-series data.

Heretofore, no known system or methods have addressed the question of analyzing the relationship between multiple anomalies across a high dimensional time-series data and consolidating the potentially large number of anomaly alarms.

BRIEF SUMMARY

According to one or more embodiments of the present invention, an approach for an alarm consolidation problem is based on an inference procedure built on a graphical Granger model estimated on the multi-variate time-series data. According to some embodiments of the present invention, a formulation for a root cause analysis is defined using a notion of scenario analysis performed using the underlying Granger causal model. Building on this notion of root cause, the problem of alarm consolidation is formulated as a combinatorial optimization problem, which trades off the minimization of the number of root causes for the entire set of anomaly alarms and the compromise in the quality of root cause attributions involved. The present disclosure includes a proof that the optimization task thus defined is a special case of the problem of sub-modular function minimizations (SMFM) under mild assumptions for which several polynomial time algorithms exist in the literature.

Although the sub-modular nature is appealing, known polynomial time SMFM algorithms in the literature are still not practical and can be hard to implement. To address this issue, according to one or more embodiments of the present invention, an improved algorithm for anomaly consolidation is described, which can be readily implemented and is computationally efficient. The algorithm uses a Belief Propagation (BP) approach, which is a heuristic for solving inference problems arising in probabilistic graphical models. While BP typically finds a local optimal solution, according to at least one embodiment of the present invention, the improved BP finds a global optimal for several classes of sparse Granger causal models.

According to at least one embodiment of the present invention, a method for anomaly alarm consolidation includes detecting a plurality of anomalies in time-series data received from an information technology infrastructure; identifying a plurality of root-cause candidates for each of the anomalies; generating, by a scenario analysis of the anomalies, a plurality of alarms, wherein the scenario analysis predicts a plurality of future expected values of the time-series data over a plurality of historical values of the time-series data using a graphical Granger causal model and generates the alarms based on a difference between the future expected values of the time-series data and actual values of the anomalies in the time-series data; and performing a belief propagation procedure between the root-cause candidates and the alarms to determine a plurality of root-causes that collectively comprise attributed root-causes for the alarms.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide for:

a BP approach to the anomaly consolidation problem for high dimensional time-series data based on Granger graphical models, where the BP approach can be readily programmed, computationally efficient, exhibits time persistency (in decisions), and has a strong parallelization potential.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

Preferred embodiments of the present invention will be described below in more detail, with reference to the accompanying drawings:

FIG. 1 depicts a grouped graphical Granger modeling method;

FIG. 3 is a table of alarm KPIs at a particular timestamp, all consolidated to a set of root-cause KPIs by a BP method according to some embodiments of the present invention;

DETAILED DESCRIPTION

Figure 2:
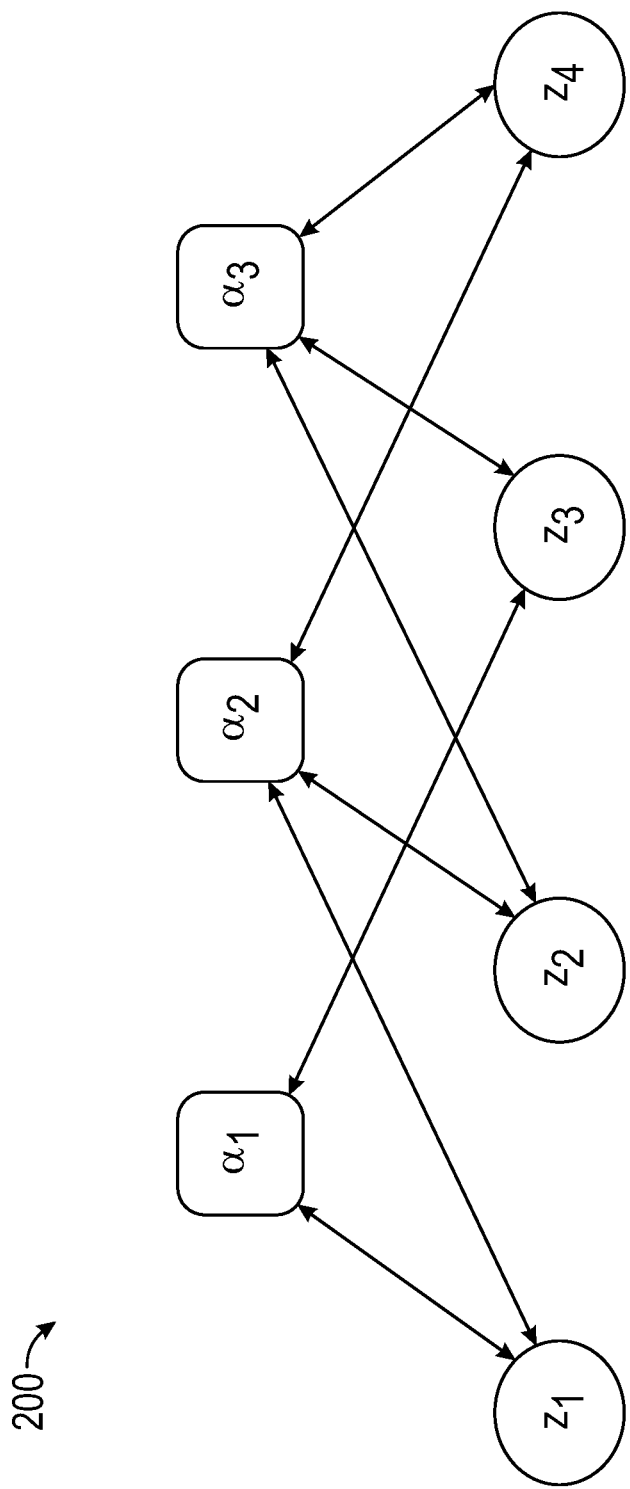
FIG. 2 depicts a Bipartite graph induced by variables and factors for a graphical model according to some embodiments of the present invention.

According to one or more embodiments of the present invention, a method of alarm consolidation uses an inference procedure built on a graphical Granger model estimated on multi-variate time-series data. According to some embodiments of the present invention, a formulation for a root cause analysis is defined using a notion of scenario analysis performed using the underlying Granger causal model.

A feature causal network is a directed graph over a set of features, in which each edge is labeled with a natural number called the lag of the edge. The semantics of a feature causal network is akin to that of Bayesian networks, but with the underlying premise that an edge necessarily entails causation, analogously to the interpretation of an edge in causal networks Causal modeling methods can be used to infer the structure of the feature causal network, given as input time series data generated by its associated stochastic process. The structure of the causal network refers to a directed graph over the feature space, potentially excluding the lag labels attached to the edges, or the particular statistical models in the associated temporal data generation model. Thus, the performance of a causal modeling method can be measured in terms of a measure of similarity between the output or hypothesis graph and the target graph that gave rise to the input data.

Building on the notion of scenario analysis for root cause analysis, the problem of alarm consolidation is formulated as a combinatorial optimization problem, which balances the number of root causes (e.g., minimization of the number of root causes) for the entire set of anomaly alarms and the quality of root cause attributions involved. The present disclosure includes a proof for an exemplary optimization task, showing that the optimization task, as defined, is a special case of the problem of sub-modular function minimizations (SMFM) with certain (mild) assumptions.

Herein, the terms anomaly and alarm are used interchangeably.

According to embodiments of the present invention, the graphical Granger model refers to the type of statistical models and causal models that are obtained using a graphical Granger modeling methodology. This approach includes estimating a Vector Auto-Regressive (VAR) model for multi-variate time-series data using sparse estimation methods, with an emphasis on the correctness of the estimated Granger causal structure. The correctness of the estimated causal structure equates to the proposition that a graph between time-series variables obtained by placing an edge from each time-series variable to another time-series variable just in case lagged variables of the former time-series variable, as a group, are included as independent variables in the VAR model estimated for the latter time-series variable, correctly captures the causal, conditional dependence relationships underlying the generative process of the relevant data. Examples of these include the grouped graphical Granger modeling methods, relying on sparse regression methods with group variable selection capability, and possible combinations of such methods with other methods of causal modeling developed mainly for non-time-series data based on conditional independence test, etc. (See, for example, Glymour, C., Scheines, R., Spirtes, P., & Kelly, K. "Discovering Causal Structure: Artificial Intelligence, Philosophy of Science, and Statistical Modeling," Academic Press, 1987). It should be understood that there are two "levels" of variables, i.e., time-series variables and their constituent, lagged variables, and that each of the multiple time-series variables comprises multiple lagged variables in sequence. That is, according to one embodiment, while "time-series" implies "sequential," and the constituent lagged variables are sequential, the time-series variables themselves are potentially causally related to one another, rather than sequentially related, which is the target of causal modeling or estimation. According to one embodiment, a causal structure is a graph defined between the time-series variables, as groups, rather than between the individual lagged variables.

Figure 7:
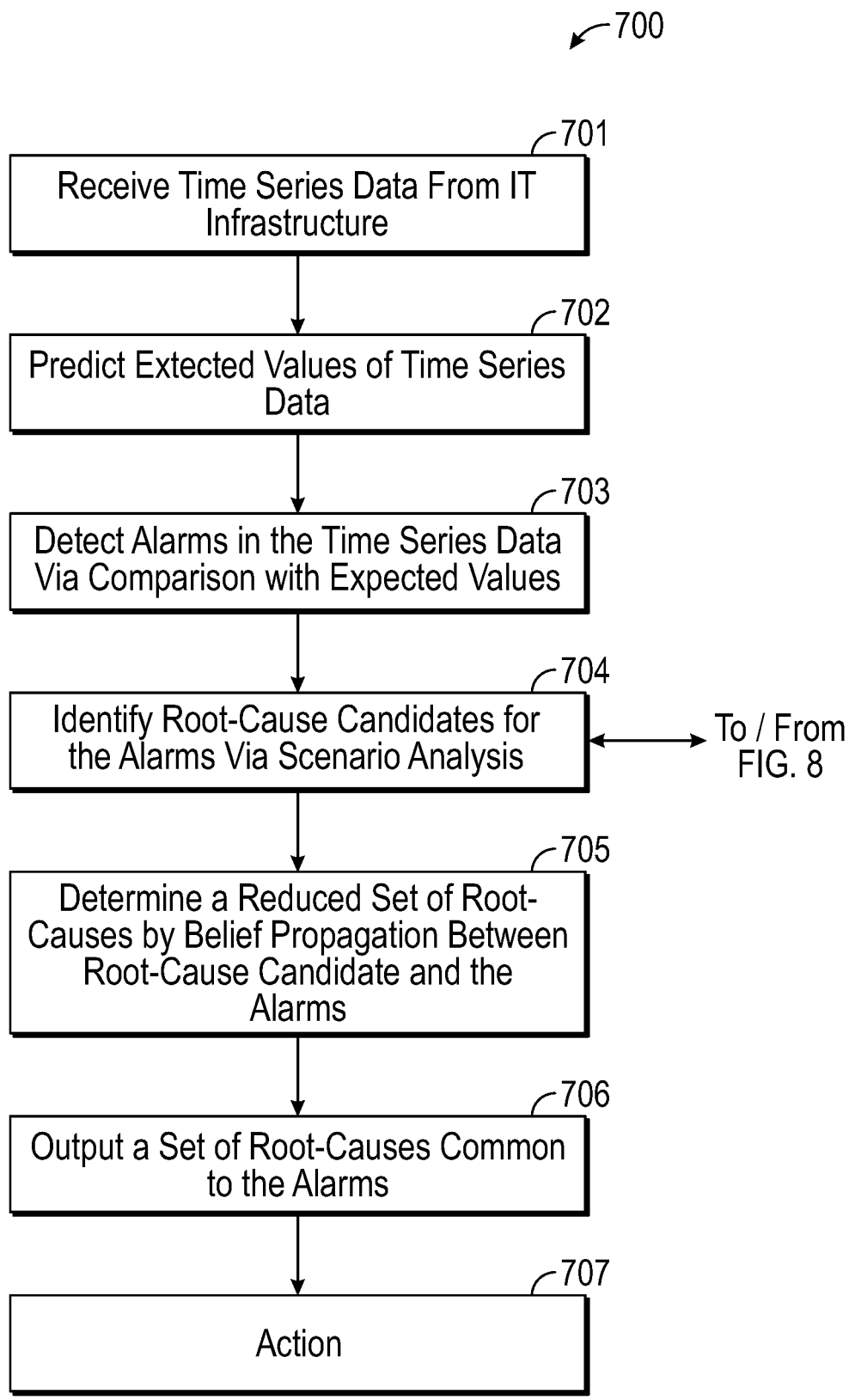
FIG. 7 depicts a flow diagram for a method of alarm consolidation according to some embodiments of the present invention.

According to one or more embodiments of the present invention, the alarm consolidation is based on a formulation of a root cause analysis, which is defined using a notion of scenario analysis performed using the underlying Granger causal model (see 705, FIG. 7). A time-series is likely a root cause of another, if changing its value to its expected value and running a scenario analysis using the causal model contributes to turning off the anomaly alarm in question. Building on this notion of root causes, the problem of alarm consolidation is formulated as a combinatorial optimization problem, which trades off the minimization of the number of root causes for the entire set of anomaly alarms and the compromise in the quality of root cause attributions involved.

According to a mathematical proof developed by the inventors, the combinatorial optimization problem for alarm consolidation, OAC (Optimization for Alarm Consolidation), is NP-hard in general, namely it can be reduced to an NP-hard set cover problem. According to some embodiments, certain sufficient conditions are provided under which OAC becomes solvable in polynomial-time. Specifically, under these conditions, OAC is a special case of the sub-modular function minimizations (SMFM) problem. Although a sub-modular nature is appealing for the algorithm design and has been extensively studied in the area of combinatorial optimization, existing polynomial-time SMFM algorithms are still not practical and can be difficult to implement.

According to at least one embodiment of the present invention, a method for OAC is described that can be easily implemented and that is computationally efficient. According to one or more embodiments, the method for OAC uses a Belief Propagation (BP) method (see FIG. 7, block 706), which is a heuristic for solving inference problems arising in probabilistic graphical models. Exemplary BP methods include the sum-product and the max-product variants. In the case of the max-product BP, the method finds a global and local optimal solution for graphical models without loops and with loops, respectively. Remarkably, implemented in the OAC problem according to embodiments of the present invention, the max-product BP (710) finds the global optimal solution even for certain loopy sparse Granger causal models (see Theorem III). According to some embodiments of the present invention, a connection is identified between the sum-product BP method and an LP (Linear Programming) relaxation to the OAC problem, which implies that the sum-product BP (709) works if the LP relaxation is tight (i.e., has a unique integral solution). According to at least one embodiment, time persistency can be encouraged or enforced in BP decisions.

As described herein, experimental results show that a BP method of alarm consolidation according to an embodiment of the present invention achieves a significant reduction in the number of alarms generated, while maintaining a good quality in the root cause attribution. The reduction in the number of alarms is achieved by finding a subset of alarms (e.g., optimal subset), which can be attributed to have caused the remaining alarms, hence consolidating them. Furthermore, according to at least one embodiment of the present invention, an algebraic technique allows the method to reuse cached scenario analysis results (see 711, FIG. 7) when performing alarm consolidation over multiple timestamps, by algebraically breaking down a quantity representing a degree of root cause attribution of one alarm to another at a timestamp of interest to the same quantity from the previous time step. (An exemplary technique, according to one embodiment, for reducing the number of scenario analyses to be run is described in detail herein.) This algebraic technique provides a significant reduction in the total number of scenario analyses needed by the method, and consequently boosts the speed of alarm consolidation by a factor of about two or more, since in at least one embodiment, the BP method spends at least 90% of its total running time on performing the scenario analysis.

In view of the foregoing, embodiments of the present invention are directed to a BP method for an anomaly consolidation problem for high dimensional time-series data based on Granger graphical models. Exemplary embodiments can be conveniently implemented in computer code, are computational efficient, and exhibit time persistency (in decisions) and strong parallelization. Moreover, the submodular nature of the anomaly consolidation problem allows for further extensions for high-performance anomaly consolidation methods (e.g., greedy-type algorithms or convexity-based algorithms) for high dimensional time-series data.

Turning now to a description of Granger causality, the Granger causality is an operational notion of causality. Specifically, a time-series X is said to "Granger cause" another time-series Y, if the accuracy of regressing for Y in terms of past values of Y and X is statistically significantly better than that of regressing just with the past values of Y alone. More formally, let $\{X(t)\}_{t=1}^T$ denote the lagged variables for time-series X and $\{Y(t)\}_{t=1}^T$ the lagged variables for Y. In a simplified form of Granger test, we perform the following two regression models:

$$Y(t) \approx \sum_{j=1}^d A_j \cdot Y(t-j) + \sum_{j=1}^d B_j \cdot X(t-j) \quad (1)$$

$$Y(t) \approx \sum_{j=1}^d A_j \cdot Y(t-j), \quad (2)$$

where d is the maximum lag allowed in the modeling. A statistical significance test can be applied on the question of whether or not Eq. (1) is more accurate than Eq. (2). If it is, then we say that X Granger-causes Y, and otherwise not. The above definition is related to the notion of conditional independence, which can be used to characterize lack of causal relationship. Under the notion of conditional independence, where Eq. (1) is not more accurate than Eq. (2), the future values of Y are conditionally independent of the past values of X, given the past values of Y.

The foregoing definition of "Granger Causality" is a notion of pseudo-causality for a pair of time-series. When there are a large number of time-series present, the question arises of how to determine a Granger causal model for the entire set of time-series by extending the pair-wise notion of Granger causality. The term, "Graphical Granger modeling," refers to an approach to this problem based on techniques for graphical models, such as sparse estimation methods for regression. With this approach, one estimates a VAR model for multi-variate time-series data, with emphasis on the correctness of the estimated "Granger causal" structure. Examples of these include the grouped graphical Granger modeling methods, relying on sparse regression methods with group variable selection capability. See, for example, A. C. Lozano, N. Abe, Y. Liu, S. Rosset, "Grouped graphical Granger modeling for gene expression regulatory networks discovery", Bioinformatics, 25(12), 2009. The description of a generic procedure for grouped graphical Granger modeling method 100 is shown in FIG. 1. In the method depicted in FIG. 1, consider n real-valued time-series $$X_1 = \{X_1(t)\}_{t=1}^T, X_2 = \{X_2(t)\}_{t=1}^T, \ldots, X_n = \{X_n(t)\}_{t=1}^T.$$

Consider here two generic types of BP (Belief Propagation) algorithms, i.e., the max-product BP and the sum-product BP. Let $z_i$ be a 0-1 random variable, i.e., $z_i$ can take the value of either 0 or 1. Let $z=[z_1, z_2, \ldots, z_n]$ be an n-dimensional vector of $z_i$'s. Let the joint probability of z be:

$$Pr[z] \propto \prod_{\alpha \in F} \psi_\alpha(z_\alpha),$$

where $\{\Psi_\alpha\}$ are (given) non-negative functions, the so-called factors; F is a collection of subsets $\{\alpha_1, \alpha_2, \ldots, \alpha_k\} \subset 2^{[1,2,3,\ldots n]}$ (each $\alpha_j$ selects a subset of the elements of z, i.e., $\alpha_j \subseteq [1,2,3,\ldots n]$); $z_\alpha$ is the projection of z onto dimensions included in $\alpha$. For example, if $z=[0,1,0]$ and $\alpha=\{1,3\}$, then $z_\alpha=[0,0]$. In particular, when $|\alpha|=1$, $\Psi_\alpha$ is called a variable factor. If a joint distribution can be expressed as the above product-form, it is called a graphical model, also known as a Markov Random Field. FIG. 2 depicts the relation between factors F ($\alpha_1$, $\alpha_2$, $\alpha_3$) and variables z ($z_1$, $z_2$, $z_3$, $z_4$)). Stated simply, FIG. 2 is a bipartite graph 200 induced by variables and factors for an example graphical model. Assignment z* is called a maximum a posteriori (MAP) assignment if $$z^* = \arg\max_{z \in \{0,1\}^n} Pr[z].$$

This means that computing a MAP assignment requires a comparison of Pr[z] for all possible z, which is typically computationally intractable (i.e., NP-hard) unless the induced bipartite graph of factors F and variables z has a bounded treewidth.

BP methods are popular heuristics for approximating the MAP assignment in a graphical model. BP is an iterative procedure; at each iteration t, there are four messages $\{m_{\alpha \rightarrow i}^t(c), m_{i \rightarrow \alpha}^t(c):c \in \{0,1\}\}$ between every variable $z_i$ and every associated factor $\Psi_\alpha | F_i$, where $F_i := \{\alpha \in F: i \in \alpha\}$; that is, $F_i$ is a subset of F such that all the a in $F_i$ include the $i^{th}$ position of z for any given z. Initially, set $m^0_{\alpha \rightarrow i}(c) = m^0_{i \rightarrow \alpha}(c) = 1$, and messages under the max-product and sum-product BPs are updated as follows:

Max-product BP:

$$m_{\alpha \rightarrow i}^{t+1}(c) = \max_{z_\alpha : z_i = c} \psi_\alpha(z_\alpha) \prod_{j \in \alpha \setminus i} m_{j \rightarrow \alpha}^t(z_j) \quad (3)$$

$$m_{i \rightarrow \alpha}^{t+1}(c) = \prod_{\alpha' \in F_i \setminus \alpha} m_{\alpha' \rightarrow i}^t(c) \quad (4)$$

Sum-product BP:

$$m_{\alpha \rightarrow i}^{t+1}(c) = \sum_{z_\alpha : z_i = c} \psi_\alpha(z_\alpha)^{\frac{1}{T}} \prod_{j \in \alpha \setminus i} m_{j \rightarrow \alpha}^t(z_j) \quad (5)$$

$$m_{i \rightarrow \alpha}^{t+1}(c) = \prod_{\alpha' \in F_i \setminus \alpha} m_{\alpha' \rightarrow i}^t(c), \quad (6)$$

where the parameter T>0 in the sum-product BP method is called "temperature" and typically chosen to be close to 0 for the purpose of the MAP computation. Note that the max-product BP and the sum-product BP use max and sum in message updates, respectively.

Referring again to FIG. 2, each $z_i$ only sends messages to $F_i$; that is, $z_i$ sends messages to $\alpha_j$ only if $\alpha_j$ selects/includes i. The outer-term in the message computation (3) is a summation over all possible $z_\alpha \in \{0,1\}^{|\alpha|}$. The inner-term is a product that only depends on the variables $z_j$ that are connected to $\alpha$. The message-update (4) from variable $z_i$ to factor $\Psi_\alpha$ is a product which considers all messages received by $\Psi_\alpha$ in the previous iteration, except for the message sent by $z_i$ itself.

Given a set of messages $\{m_{i \rightarrow \alpha}(c), m_{\alpha \rightarrow i}(c):c \in \{0,1\}\}$, the BP marginal beliefs are determined as follows:

$$b_i[z_i] = \prod_{\alpha \in F_i} m_{\alpha' \rightarrow i}(z_i). \quad (7)$$

Then, the BP method outputs $z^{BP} = [z^{BP}_i]$ as $$z_i^{BP} = \begin{cases} 1 & \text{if } b_i[1] > b_i[0] \\ 0 & \text{if } b_i[1] < b_i[0] \end{cases}.$$

It can be assumed that no tie $b_i[1] = b_i[0]$ occurs, which can be guaranteed if one adds small noise to each factor function. It is known that $z^{BP}$ converges to a MAP assignment after a large enough number of iterations, if the bipartite graph induced by factors and variables is a tree. However, if the graph includes loops, the BP method has no guarantee to find a MAP solution in general.

Referring now to alarm detection and consolidation, in an alarm detection via scenario analysis (SA) (see 705, FIG. 7), a time-series $\{X_i(t)\}$ is anomalous at time t if $X_i(t)$ significantly deviates from its expected (or normal) value, namely, $EX_i(t)$. There are potentially multiple ways to evaluate the expected value $EX_i(t)$. Here an (estimated) VAR model can be used to predict an average:

$$EX_i(t) = \sum_{j \in \mathcal{J}(i)} A_{ij} \vec{X}_j(t-1) \quad (8)$$

$$:= f_i(\vec{X}_i(t-1), \vec{X}_{\mathcal{J}(i)}(t-1)), \quad (9)$$

where $\{A_{ij}\}$ are coefficients obtained by performing linear regressions in the Granger model and $\vec{X}_i(t-1) = (X_i(t-1), X_i(t-2), \ldots, X_i(t-d))$ and $\mathcal{J}(i) = (j:(j,i) \in E)$. $EX_i(t)$ can be recursively calculated as:

$$EX_i(t) = f_i(\vec{EX}_i(t-1), \vec{EX}_{\mathcal{J}(i)}(t-1)),$$

where $EX_i(t-1) = f(EX_i(t-1), \ldots, EX_i(t-d))|$, etc. Predicting the future expected values, e.g., $EX_i(t)$, using historical values (using the Granger model) is referred to as forecasting. According to at least one embodiment of the present invention, a SA predicts the future expected values (hereinafter, expected values) using the Granger model, wherein historical values for designated time-series variables are replaced by their expected values. Exemplary methods discussed herein for alarm consolidation use the SA results. The complexity in SA's affects an overall running time of alarm consolidation. Given time t≥0, let $\mathcal{A}(t) \subset V$ denote the set of anomaly alarms, which defined as:

$$\mathcal{A}(t) := \{i \in V: |X_i(t) - EX_i(t)| > \delta\},$$

where δ>0 is some constant. Namely, i is an alarm at time t if the actual value $X_i(t)$ is far from the expected value $EX_i(t)$.

Turning to an optimization for alarm consolidation (OAC), according to some embodiments of the present invention, the (anomaly) alarm consolidation problem, identifies a small number of common root-causes given a large number of anomaly alarms $\mathcal{A} = \mathcal{A}(t)$ at each time t (see 706, FIG. 7). Formally, let $\mathcal{R} = \cup_{i \in \mathcal{A}} \mathcal{J}(i)$ denote the set of candidate root-causes (704). Let H denote the undirected bipartite graph with left-vertices right-vertices $\mathcal{A}$ |, right-vertices $\mathcal{R}$, and edges $E(H) = \{(i,j): j \in \mathcal{J}(i)\}$. In addition, δ(i) (or δ(j)) and $\mathcal{A}$(j) denote the sets of incident edges at i $\in \mathcal{A}$ (or j $\in \mathcal{R}$) and neighboring vertices of j $\in \mathcal{R}$ in graph H, respectively.

According to some embodiments of the present invention, $Z = [Z_e] \in \{0,1\}^{E(H)}$ is used as the indicator variable for root-cause relations, i.e., $Z_{ij} = 1$ if j is a true root-cause for i and $Z_{ij} = 0$ otherwise. Hence, $\mathcal{R}_i(Z) = \{j: Z_e = 1, e = (i,j) \in \delta(i)\}$ denotes the set of root-causes of anomaly alarm i, and the set of all root-causes over alarms is $$\mathcal{R}(Z) := \bigcup_{i \in A} \mathcal{R}_i(Z) = \{j \in \mathcal{R}: |Z_{\delta(j)}| > 0\}.$$

According to embodiments of the present invention, it is assumed that the number of root-causes for each alarm is at most k, i.e., $|\mathcal{R}_i(Z)|=|Z_{\delta(i)}|\leq k$.

Turning to the properties for root-causes Z. For each $i \in \mathcal{A}$ |, define $$EX_i^Z(t) = EX_i^{Z_{\delta(i)}}(t)$$
$$= f_i\left(\left[\overrightarrow{EX}_j(t-1)\right]_{j\in \mathcal{R}_i(Z)}, \left[\overrightarrow{X}_j(t-1)\right]_{j\in \mathcal{J}(i)\setminus \mathcal{R}_i(Z)}\right),$$

where $EX_i^Z(t)$ denotes the expected value of $X_i(t)$ provided root-causes $\mathcal{R}(Z)$ are revised to their expected values. Hence, if $EX_i^Z(t)$ is close to $EX_i(t)$, it can be concluded that the alarm i is likely due to root-causes $\mathcal{R}_i(Z)$. Equivalently, $\mathcal{R}_i(Z)$ is a good set of root-causes for alarm i if the following quantity is negative and with a relatively large absolute value $$\Phi_i^t(Z) = \Phi_i^t(Z_{\delta(i)}) \quad (10)$$
$$= |EX_i^Z(t) - EX_i(t)| - |EX_i^0(t) - EX_i(t)|,$$

where 0 is the vector of 0's. Intuitively speaking, this is an examination of how much fixing the candidate root causes helps bring back the target time-series back to normal, as compared to the values predicted based on the as-is scenario.

According to at least one exemplary embodiment, one goal is to find Z so that $\mathcal{R}(Z)$ is small and Z explains all alarms well. Formally, consider the following optimization problem:

$$Z^{AC} := \arg\min_{Z \in \{0,1\}^{E(H)}} \sum_{i\in A} \Phi_i^t(Z) + \lambda|\mathcal{R}(Z)|, \quad (11)$$

subject to $|\mathcal{R}(Z)| \leq k, \forall i \in \mathcal{A}, \quad (12)$ where $\lambda > 0$ is a parameter to control the degree to which sparsity of root-causes is encouraged.

Figure 5:
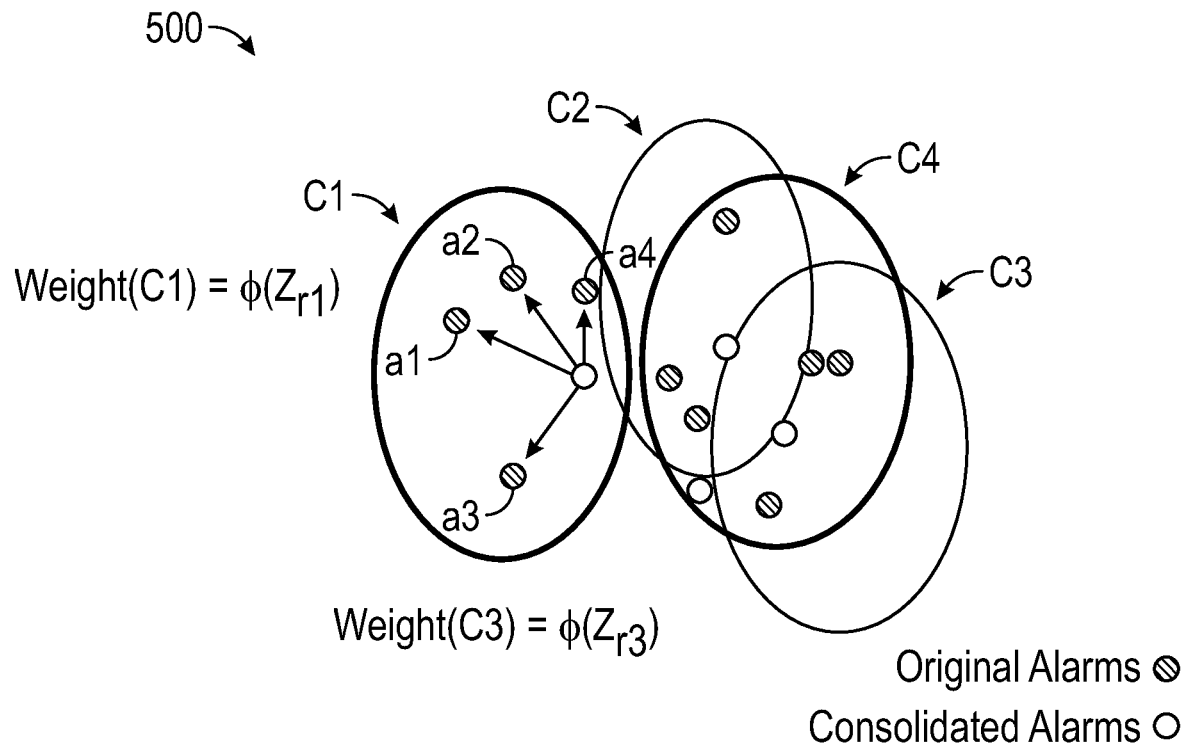
FIG. 5 is an illustration of an exemplary optimization according to some embodiments of the present invention.

According to some embodiments of the present invention, an output (see 707, FIG. 7) of optimization can be viewed as a collection of sets of alarms attributed to, or caused by, a set of root causes in a causal graph 500 as in FIG. 5. In view of the foregoing, according to some embodiments of the present invention, when used in combination with an existing alarm flagging method (for example, detecting anomalies—alarms—at block 703 of FIG. 7), alarm consolidation improves the accuracy of the alarm flagging and reduces the number of alarms. Some embodiments of the present invention reduce false negatives generated by existing alarm flagging methods. Accordingly, embodiments of the present invention can be implemented as a technological solution to technological problems specifically arising from existing alarm flagging methods in the context of time-series data acquired from an IT infrastructure.

As depicted in FIG. 5, the optimization problem can be considered an instance of the problem known in the literature as "Weighted Set Cover," in which a subset of the collection of sets of alarms, $C_i$'s, attributable respectively to the root causes $r_i$'s, is to be found, whose corresponding "weights," Weight($C_i$)'s, sum to a minimum possible, or approximately minimum, total weight. There are known polynomial time algorithms that can approximately solve this problem, such as Chvatal's algorithm (See B. Chvatal, "A greedy heuristic for the set-covering problem," Mathematics of Operations Research, 4(3):233-235, 1979), which can be used to solve this optimization sub-problem within the overall alarm consolidation problem. However, this and other related algorithms only obtain approximate best solutions. Some embodiments of the present invention achieve further improvement, as will be discussed below. Stated another way, exemplary embodiments of the present invention include technological solutions to the NP-hard alarm consolidation problem in polynomial time. Heretofore, this problem could merely be approximated.

Figure 6:
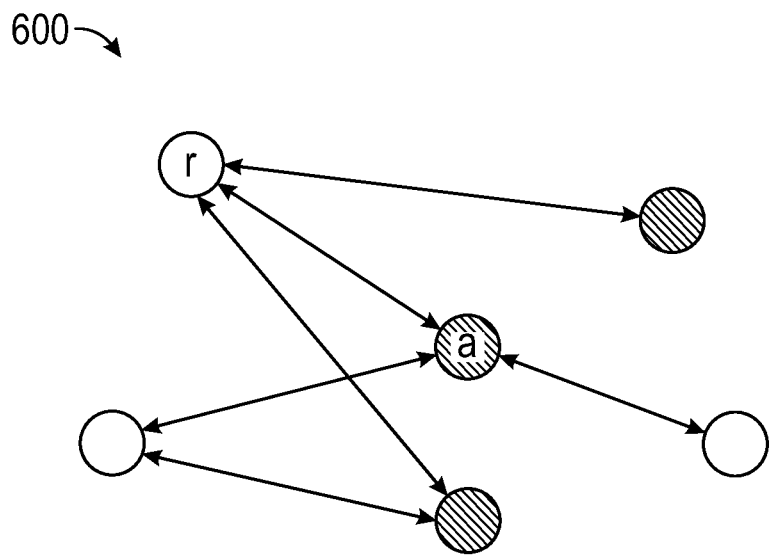
FIG. 6 is an illustration of a method for message passing between alarms and candidate root-causes according to at least one embodiment of the present invention.

FIG. 6 is an illustration 600 of a method for message passing between alarms and candidate root-causes according to at least one embodiment of the present invention. Given a set of alarms $\mathcal{A} = [a_1, \ldots, a_k]$ and root-cause candidates $\mathcal{R} = [r_1, \ldots, r_l]$, a "fitness" objective function for candidate root-causes (expressed formally as a relationship Z over A and R) can be considered as probability P[Z] given to Z such that, for some constant $\lambda$:

$$P[Z] \sim \exp(-\Sigma_{ai\in A}\Phi(Z_{\delta(i)})-\lambda)$$

According to some embodiments, the method determines Z with maximum probability (MAP problem). Since the distribution can be expressed as a product-form (or Markov random field), one can use a BP method for MAP according to at least one embodiment of the present invention, as described in detail herein.

Turning now to the complexity of alarm consolidation, herein, an alarm consolidation method according to embodiments of present invention is described as a discrete optimization problem. The following describes a proof that alarm consolidation is NP-hard in general, and a set of sufficient conditions under which the problem becomes solvable by a polynomial-time algorithm. According to some embodiments, an optimization algorithm works towards minimizing sub-modular functions and runs in polynomial-time with respect to |E(H)| and SA, where SA denotes the (maximum) time for performing a single scenario analysis.

Alarm consolidation is NP-hard when k=1. The optimization problem for obtaining ZAC is NP-hard in general under reduction to the set cover problem. That is, according to Theorem I, it is NP-hard to compute $Z^{AC}$ when k=1. More particularly, consider the case where k=1 and $\lambda>0$ is sufficiently small. Also assume that for each $i \in \mathcal{A}$ | and $j \in \mathcal{J}(i)|$, $$\Phi_i^t(e(i,j))=-1,$$

where $e=e(i,j) \in \{0,1\}^{E(H)}$ is the unit vector such that $e_{ij}=1$ and $e_{k\ell}=0$ for $(k,\ell)\neq(i,j)$. Under these setups, it can be observed that $R_i(Z^{AC})=1$ for all $i\in \mathcal{A}$ and $\Phi_i^t i(Z^{AC})-|\mathcal{A}\|$. Hence, computing $Z^{AC}$ is equivalent to solve $$\min_{Z\in\{0,1\}^{E(H)}} |\mathcal{R}(Z)|,$$

subject to $|\mathcal{R}_i(Z)| = 1, \forall i \in \mathcal{A},$

The above optimization is equivalent to the set cover problem: find the smallest subset S of $\mathcal{R}$ so that it covers $\mathcal{A}$, i.e., $\mathcal{A}| \subset \cup_{j\in S}\mathcal{A}(j)$. Since subsets $\{\mathcal{A}|(j):j\in\mathcal{R}\}$ can be given in an arbitrary manner, the general set cover problem, which is NP-hard, can be reduced to the problem of computing $Z^{AC}$ in this case.

According to at least one embodiment of the present invention, the alarm consolidation problem is solvable when k=∞, that is, with sufficient conditions under which the problem is solvable in polynomial time. Exemplary conditions are based on the notion of the so-called sub-modularity which is defined as follows.

Definition: Function h: $\{0,1\}^\Omega \to \mathbb{R}$ for some set is a sub-modular function if for all $x,y \in \{0,1\}$ with $x \leq y$ (component-wise) and every $I \in \Omega$ with $y_i = 0$, $$h(x+e(i))-h(x) \geq h(y+e(i))-h(y),$$

where e(i) is the unit vector whose coordinate corresponding to i is 1 and other coordinates are 0. If the above inequality '≥' holds with '=' or '≤', the function is called modular or super-modular, respectively.

The function of interest is $$h(Z) := \sum_{i \in \mathcal{A}} \Phi_i^t(Z) + \lambda |\mathcal{R}(Z)|,$$

where $Z^{AC}$ is obtained from minimizing h under constraint (12). The following sufficient condition guarantees that h is a sub-modular function.

Lemma A: The function h is sub-modular if for every Z,Z' and every $i \in \mathcal{A}$, $$\text{sign}(EX_i^Z(t) - EX_i(t)) = \text{sign}(EX_i^{Z'}(t) - EX_i(t)),$$

where $\text{sign}(x) = \begin{cases} 1 & \text{if } x \geq 0 \\ -1 & \text{if } x < 0 \end{cases}$.

To check that $\mathcal{R}(Z)|$ is sub-modular, verify (the fact) that for every Z and every (i,j) with $Z_{ij}=0$, $$|\mathcal{R}(Z+e(i,j))| - |\mathcal{R}(Z)| = \begin{cases} 1 & \text{if } \sum_{i' \in A(j)} Z_{i'j} = 0 \\ 0 & \text{otherwise} \end{cases}.$$

Since the summation of sub-modular functions is sub-modular, it suffices to show that $\Phi_i^t(Z)$ is sub-modular for all $i \in \mathcal{A}$ |. To this end, assuming the condition of Lemma A, let $$s_i := \text{sign} (EX_i^Z(t) - EX_i(t)) \varepsilon \{-1,1\}.$$

Using this notation, it follows $$\Phi_i^t(Z) = s_i(EX_i^Z(t) - EX_i(t)) - |EX_i^0(t) - EX_i(t)|.$$

Since $s_i$, $EX_i(t)$ and $|EX_i^0(t) - EX_i|$ are constant with respect to Z, it is sufficient to show that $EX_i^Z(t)$ is a modular function. For the modularity of $EX_i^Z(t)$, observe using the linearity of $f_i$ that $$EX_i^Z(t) = EX_i^0(t) + \sum_{j \in \mathcal{J}(i)} Z_{ij}(EX_i^{e(i,j)}(t) - EX_i^0(t)). \quad (13)$$

Therefore, $EX_i^Z(t)$ is a linear, i.e., modular, function, which implies the sub-modularity of function h. Here, it should be understood that $EX_i^{e(i,j)}(t) - EX_i^O(t)$ denotes the difference between the expected value of $X_i$ at t given by the (singleton) scenario analysis in which the root cause j is corrected, versus the expected value of $X_i$ at t given by the scenario analysis in which no root cause has been corrected. This completes the proof of Lemma A.

The condition of Lemma A holds in practical scenarios since, for a severe alarm $i \in \mathcal{A}$, changing the values of any candidate set of root-causes to their expected values will help bring the value of $X_i$ closer to its expectation, and hence the sign of $EX_i^Z(t) - EX_i(t)|$ normally does not change.

Under the condition of Lemma A, computing $Z^{AC}$ is a constrained sub-modular function minimization, for which no polynomial-time algorithm is known. In fact, the constraint (12) induces a matroid. Since the sub-modular function minimization with a cardinality constraint (which is a special case of a matroid constraint) is NP-hard, it is unlikely that a polynomial-time algorithm exists for general sub-modular function minimization constrained under the matroid constraint (12). It at least some cases, polynomial-time algorithms exist for unconstrained sub-modular function minimization problems. One exemplary algorithm due to Orlin runs in time $$O(d^5 + EO \cdot d^6),$$

where d is the domain dimension of the function h and EO is the maximum time required to evaluate h(Z) for given Z. According to some embodiments of the present invention, $d = |E(H)|$ and $EO = O(SA \cdot |\mathcal{A}|)$. Therefore, using this knowledge and Lemma A, Theorem II is reached:

Theorem II: When k=∞ and the condition of Lemma A holds, there exists an algorithm which computes $Z^{AC}$ in time $$O(|E(H)|^5 + SA \cdot |\mathcal{A}| \, |E(H)|^6).$$

Turning now to a BP method for alarm consolidation according to at least one embodiment of the present invention, it has been proved herein that the constrained discrete optimization (11) for alarm consolidation is NP-hard in general and that a polynomial-time algorithm exists under certain conditions. Even if the desired conditions in Theorem II are satisfied, existing polynomial-time algorithms in the literature for the sub-modular function minimization are difficult to use in practice.

According to some embodiments of the present invention, a BP method on an appropriately defined graphical model is a practical and scalable method. To describe the algorithm formally, first a MAP formula for $Z^{AC}$ is explained, followed by a corresponding BP method according to some embodiments of the present invention.

According to at least one embodiment of the present invention, a BP method is described in the context of its implementation complexity. To begin with, observe that the optimum $Z^{AC}$ can also be understood as a MAP in the following graphical model on $\{0,1\}^{E(H)}$:

$$Pr[Z] \propto e^{-h(Z)} = \prod_{i \in \mathcal{A}} \psi_i(Z_{\delta(i)}) \prod_{j \in \mathcal{R}} \psi_j(Z_{\delta(j)}), \text{ where} \quad (14)$$

$$\psi_i(Z_{\delta(i)}) = \begin{cases} e^{-\Phi_i^t(Z_{\delta(i)})} & \text{if } |Z_{\delta(i)}| \leq k \\ 0 & \text{otherwise} \end{cases}$$

$$\psi_j(Z_{\delta(j)}) = \begin{cases} e^{-\lambda} & \text{if } |Z_{\delta(j)}| \geq 1 \\ 0 & \text{otherwise} \end{cases}.$$

In the above, note that $\Phi_i^t(Z_{\delta(i)})$ is defined in (10).

According to some embodiments, this MAP formulation for $Z^{AC}$ allows for the application of an exemplary BP method for finding it. A BP method according to one or more embodiments of the present invention uses message passing between factors and variables. Since each variable $Z_e$ in the graphical model (14) is associated with at most two factors, the message updating rules between factors can be simplified as follows:

Max-product BP:
$$m_{i \to j}^{new}(c) \leftarrow \max_{Z_{\delta(i)}: Z_{ij}=c} \psi_i(Z_{\delta(i)}) \prod_{k \in \mathcal{J}(i) \backslash j} m_{k \to i}^{old}(Z_{ik}),$$

$$m_{j \to i}^{new}(c) \leftarrow \max_{Z_{\delta(j)}: Z_{ij}=c} \psi_j(Z_{\delta(j)}) \prod_{k \in \mathcal{A}(j) \backslash i} m_{k \to j}^{old}(Z_{kj}),$$

Sum-product BP:
$$m_{i \to j}^{new}(c) \leftarrow \sum_{Z_{\delta(i)}: Z_{ij}=c} \psi_i(Z_{\delta(i)})^{\frac{1}{T}} \prod_{k \in \mathcal{J}(i) \backslash j} m_{k \to i}^{old}(Z_{ik}),$$

$$m_{j \to i}^{new}(c) \leftarrow \sum_{Z_{\delta(i)}: Z_{ij}=c} \psi_j(Z_{\delta(j)})^{\frac{1}{T}} \prod_{k \in \mathcal{A}(j) \backslash i} m_{k \to j}^{old}(Z_{kj}),$$

for $i \in \mathcal{A}$, $j \in \mathcal{J}(i)$ and $c \in \{0,1\}|$. Equivalently, we can write $$m^{new} \leftarrow F_{BP}(m^{old}),$$

where $m^{new}$ and $m^{old}$ are vectors of new and old messages, respectively, and $F_{BP}$ is a (max-product or sum-product) BP updating function method according to one or more embodiments of the present invention.

Concerning the computational complexity of calculating the function $F_{BP}$, consider the case of max-product. In this case, updating message $m_{i \to j}$ requires at most $O(\Delta^k)$ comparisons or multiplications, where $\Delta = \max_{i \in \mathcal{A}} |\mathcal{J}(i)|$. On the other hand, updating message $m_{j \to i}$ can be simplified significantly as follows:

Simplified Max-product BP:
$$m_{j \to i}^{new}(1) \leftarrow e^{-\lambda} \prod_{k \in \mathcal{A}(j) \backslash i} \max\{m_{k \to j}^{old}(0), m_{k \to j}^{old}(1)\}$$

$$m_{j \to i}^{new}(0) \leftarrow \max\left\{m_{j \to i}^{new}(1), \prod_{k \in \mathcal{A}(j) \backslash i} m_{k \to j}^{old}(0)\right\}.$$

Now, consider a sum-product BP method according to one or more embodiments of the present invention. Similar to an exemplary max-product BP method, updating message $m_{i \to j}$ again requires at most $O(\Delta^k)$ additions or multiplications. Updating message $m_{j \to i}$ can be also simplified as follows:

Simplified Sum-product BP:
$$m_{j \to i}^{new}(1) \leftarrow e^{-\lambda/T} \prod_{k \in \mathcal{A}(j) \backslash i} m_{k \to j}^{old}(0) + m_{k \to j}^{old}(1)$$

$$m_{j \to i}^{new}(0) \leftarrow m_{j \to i}^{new}(1) + (1 - e^{-\lambda/T}) \prod_{k \in \mathcal{A}(j) \backslash i} m_{k \to j}^{old}(0).$$

Therefore, for both the max-product and sum-product BPs according to one or more embodiments, it is possible to determine the function $F_{BP}$ in time $(SA \cdot \Delta^k |E(H)|)|$ and the naive upper bound for the running time of the BP methods in T iterations is:

$$O(SA \cdot T \Delta^k |E(H)|).$$

In fact, according to one or more embodiments, exemplary BP methods can be made to run faster. Consider that, given the derivation of (13), every $EX_i^Z(t)|$ required for the computation of the values of function $\psi_i$ can be expressed as a linear combination of values in $\{EX_i^{e(i,j)}(t) \in j \in \mathcal{H}_i\}$. Stated another way, the number of scenario analyses needed for computing all values in $\{EX_i^{e(i,j)}(t)\}$ is at most $|E(H)|$, which is independent of T, k and $\Delta$. Hence, according to one or more embodiments, BP methods of T iterations runs in time:

$$O((SA + T\Delta^k) \cdot |E(H)|),$$

where one can choose T, $\Delta = O(1)$ and k=1,2 for practical purposes. After T iterations of updating messages, the algorithm outputs $Z^{BP-AC} = [Z_{ij}^{BP-AC}] \in \{0,1\}^{E(H)}$ (to approximate $Z^{AC}$) as follows:

$$Z_{ij}^{BP-AC} = \begin{cases} 1 & \text{if } m_{j \to i}(1) m_{i \to j}(1) > m_{j \to i}(0) m_{i \to j}(0) \\ 0 & \text{if } m_{j \to i}(1) m_{i \to j}(1) < m_{j \to i}(0) m_{i \to j}(0) \end{cases}.$$

Existing BP methods have been popular heuristics for the MAP computation in a graphical model, however with limited theoretical understanding. For example, existing BP methods may not converge to its fixed-point m*, where:

$$m^* = F_{BP}(m^*).$$

Nevertheless, BP outputs are typically expected to be good even before convergence, and for a practical purpose, one can run T iterations of BP for some fixed T>0 without waiting for its convergence. Once a BP method (or any alternative) converges to m*, the question of whether the BP output corresponding to m* is good still remains. To distinguish between the max-product and sum-product BPs, the symbols $Z^{MBP*-AC}$ and $Z^{SBP*-AC}$ are used, which correspond to $Z^{BP-AC}$ determined using the max-product and sum-product BP fixed points, respectively.

Turning to the optimality of a max-product BP method according to some embodiments of the present invention, the max-product BP, i.e., $Z^{MBP*-AC}$, has the following optimal property.

Lemma B (SLT Optimality). Consider a union $U \subset E(H)$ of disjoint trees and (possibly empty) single cycle in graph H. Then, it holds that $$Pr[Z^{MPBP*-AC}] \geq \max_{Z: Z_e = Z_e^{BP-AC}, \forall e \notin U} Pr[Z].$$

The above statement implies that the quality of $Z^{MBP*-AC}$ is better than a local optimum and worse than the global optimum $Z^{AC}$. Due to the computational hardness stated in Theorem I, any algorithm (including some embodiments of a BP method according to the present invention) cannot always compute the global optimum $Z^{AC}$ (in polynomial-time) unless P=NP. However, for some special structure of H, the global optimality of $Z^{MBP*-AC}$ can be stated as follows.

Theorem III. $Z^{MBP*-AC}$ is the global optimum, i.e., $Z^{AC}$, in the following cases:

(a) H is a tree graph, or (b) k=1 and $\max_{j \in \mathcal{R}} \mathcal{A}(j)| \leq 2$ Proof. It suffices to prove that in the cases (a) and (b), the SLT optimality of $Z^{MBP*-AC}$ implies the global optimality. Considering case (b) and a subgraph H' of H defined as follows:

$$H' = \{e \in E(H): Z_e^{MBP*-AC} = 1 \text{ or } Z^{AC} = 1\}.$$

In the case (b), one can check that the degree of every vertex in H' is either 0, 1 or 2. Hence, H' is a disjoint union of paths {P} and cycles {C}. For each P(or C) and assignment $Z \in \{0,1\}^{E(H)}$, one can naturally define the function $h(Z_P)$ (or h ($Z_C$)) for the sub-assignment $Z_P$(or $Z_C$). Since paths and cycles are disjoint, it follows that:

$$h(Z^{MPBP*-AC}) - h(Z^{AC}) =$$
$$\sum_P \left[h\left(Z_P^{MPBP*-AC}\right) - h(Z_P^{AC})\right] + \sum_C \left[h\left(Z_C^{MPBP*-AC}\right) - h(Z_C^{AC})\right] \leq 0,$$

where the inequality is from the SLT optimality of $Z^{MBP*-AC}$. Therefore, due to the global optimality of $Z^{AC}$, we can conclude that h. $Z^{MBP*-AC} = h(Z^{AC})$, i.e., $Z^{MBP*-AC}$ is a global optimum as well.

Turning to the optimality of sum-product BP, i.e., $Z^{MBP*-AC}$. To this end, consider the following function:

$$F_{Bethe} := F_{Energy} + T \cdot F_{Entropy}$$

$$F_{Energy} := \sum_{i \in \mathcal{A}} \sum_{Z_{\delta(i)}} b_i(Z_{\delta(i)}) \Phi_i^s(Z_{\delta(i)}) + \lambda \sum_{j \in \mathcal{R}} (1 - b_j(0))$$

$$F_{Entropy} := \sum_{i \in \mathcal{A}} \sum_{Z_{\delta(i)}} b_i(Z_{\delta(i)}) \ln b_i(Z_{\delta(i)}) +$$

$$\sum_{j \in \mathcal{R}} \sum_{Z_{\delta(j)}} b_j(Z_{\delta(j)}) \ln b_j(Z_{\delta(j)}) + (1 - |\delta(i)| - |\delta(j)|) \sum_{(i,j) \in E(H)} b_{ij}(Z_{ij}) \ln b_{ij}(Z_{ij}),$$

where $F_{Energy}$, $F_{Entropy}$ are called 'Energy' and '(Bethe) Entropy' functions, respectively, and the domain $D_{Bethe}$ of the Bethe function $F_{Bethe}$ is:

$$D_{Bethe} := \Big\{[b_i(Z_{\delta(i)}), b_j(Z_{\delta(j)}), b_{ij}(Z_{ij})]:$$

$i \in \mathcal{A}, j \in \mathcal{R}, (i,j) \in E(H),$      (a)

$Z_{b(i)} \in \{0,1\}^{|\delta(i)|}, Z_{\delta(j)} \in \{0,1\}^{|\delta(j)|}, Z_{ij} \in \{0,1\},$      (b)

$b_i(Z_{\delta(i)}), b_j(Z_{\delta(j)}), b_{ij}(Z_{ij}) \in [0,1]$      (c)

$b_i(Z_{\delta(i)}) = 0,$ for all $Z_{b(i)}$ such that $|Z_{\delta(i)}| > k,$      (d)

$\sum_{Z_{ij}} b_{ij}(Z_{ij}) = 1,$      (e)

$\sum_{Z_{\delta(i)\backslash(i,j)}} b_i(Z_{\delta(i)\backslash(i,j)}, Z_{ij}) = b_{ij}(Z_{ij}),$      (f)

$\sum_{Z_{\delta(i)\backslash(i,j)}} b_i(Z_{\delta(i)\backslash(i,j)}, Z_{ij}) = b_{ij}(Z_{ij})\Big\}.$      (g)

The set of BP marginal beliefs, $b_i(Z_{\delta(i)})$, $b_j(Z_{\delta(j)})$, $b_{ij}(Z_{ij})$, determined at a sum-product BP fixed point correspond to a (local) minimizer of the function $F_{Bethe}$ under the domain $D_{Bethe}$. Choosing small T>0, F $F_{Bethe}$ is dominated by $F_{Energy}$, and hence one can think the sum-product BP minimizes the linear objective $F_{Energy}$ under the polytope $D_{Bethe}$. Furthermore, one can check whether a minimizer of $F_{Energy}$ under the polytope $D_{Bethe}$ is (close to) an integral point, $Z^{SBP*-AC}$ determined using the integral minimizer as BP marginal beliefs is equal to $Z^{AC}$. In other words, the sum-product BP tries to solve a LP (Linear Programming) relaxation of the OAC problem. Although the LP relaxation is solvable using traditional methods (ellipsoid, interior-point or simplex), the main appeals of BP are its ease of programming and strong parallelization potential.

Regarding the time persistency in BP decisions, note that there can be multiple BP fixed-points in general and the BP method may converge to a different fixed-point depending on the initial messages. Hence, if the same alarm tends to be persistent over consecutive times t and t+1, embodiments of the present invention use the last messages (e.g., stored messages) for the alarm at time t as initial messages at time t+1 to encourage the time persistency of the BP decision $Z^{BP-AC}$. This is an additional benefit of an exemplary BP method in alarm consolidation. In addition, there is a systematic way to force time persistency by designing time persistent factor functions, e.g., consider $$\psi_i(Z_{\delta(i)}) = \begin{cases} e^{-\sum_{\alpha=0}^{t} \alpha^{t-s} \Phi_i^s(Z_{\delta(i)})} & \text{if } |Z_{\delta(i)}| \leq k \\ 0 & \text{otherwise} \end{cases} \quad (15)$$

where $\alpha \in [0,1]$ is some constant. In the above, if $\alpha$ is chosen to be large, the factor function $\psi_i$ does not change too much over time, and consecutive BP decision tend to be time persistent. By considering the factor function (15) with $\alpha > 0$, the prior historical data before time t can be utilized for the alarm consolidation at the current time t.

As described above, it should be understood that the computational efficiency of the message updates can be improved by: 1) leveraging the linearity of the statistical model, when the model is indeed linear, by measuring the impact on the attribution inaccuracy for each alarm attributed by each root cause, and ignore message updates between them if the measured impact is negligible; 2) leveraging the linearity of statistical model, when the model is indeed linear, by measuring the impact on the attribution inaccuracy for each alarm attributed by root causes by summing that of each root-cause; 3) leveraging the sparsity of actual root-causes by considering only sparse subsets of alarms in message updates from alarms to root-causes; 4) leveraging redundancy in the scenario analysis by storing (and re-using) prior preformed scenario analyses since many message passing updates use common scenario analysis results (see 711, FIG. 7 and description below); and/or 5) leveraging re-use of prior messages by choosing messages in the prior alarm consolidation as the initial messages in the current alarm consolidation.

Several experimental results validate the effectiveness of a max-product BP method according to embodiments of the present invention. An exemplary max-product BA method was used for experimentation, since the sum-product BP method uses an extra parameter setting (of the temperature parameter T), and may have relatively slower convergence. Using two real world data sets from the domain of computer network monitoring, the first set with 4070 timestamps (at 15 minute intervals) with 2058 Key Performance Indicators (KPIs), i.e., T=4070 and n=2058, and the second with T=3000 and n=19998. Each KPI indicates the value of a certain metric, such as traffic (in/out bytes), response information (average and maximum time, availability), CPU data (load, memory used), database information (disk space used), and others of a particular node or machine in the system. According to some embodiments, a KPI indicates a measurement of the system's performance or health.

The quality of consolidation results is shown in FIG. 3, illustrating an example alarm consolidation result 300 on a given data set, where twenty alarms appearing at a same timestamp are consolidated to three root-cause KPIs (i.e., 10104, 10554, and 10107) by the BP method. As shown in FIG. 3, the twenty anomaly alarms are consolidated down to three root causes. The KPI's flagged by these twenty alarms are diverse, including Node2:Env3-Query-Rate, Node2:Env1-Total-Wait-Time, Node2:Env3-Connection-Max-Wait-Time, Node1:Env1-Method-Invocations, etc. At a glance it is not apparent what might be the root cause of these alarms.

By inspecting the plots of some of the KPI's identified in these alarms (e.g., see FIG. 4), a degradation in application performance (as indicated by sudden changes in many KPI's, including, for example, the KPI 'Node1:Env6-Total-Wait-Time') in a certain node is attributed to a surge in database usage in another node (in the KPI named 'Node2:Database-Average-Usage-Time'), which precedes the former.

Figure 4:
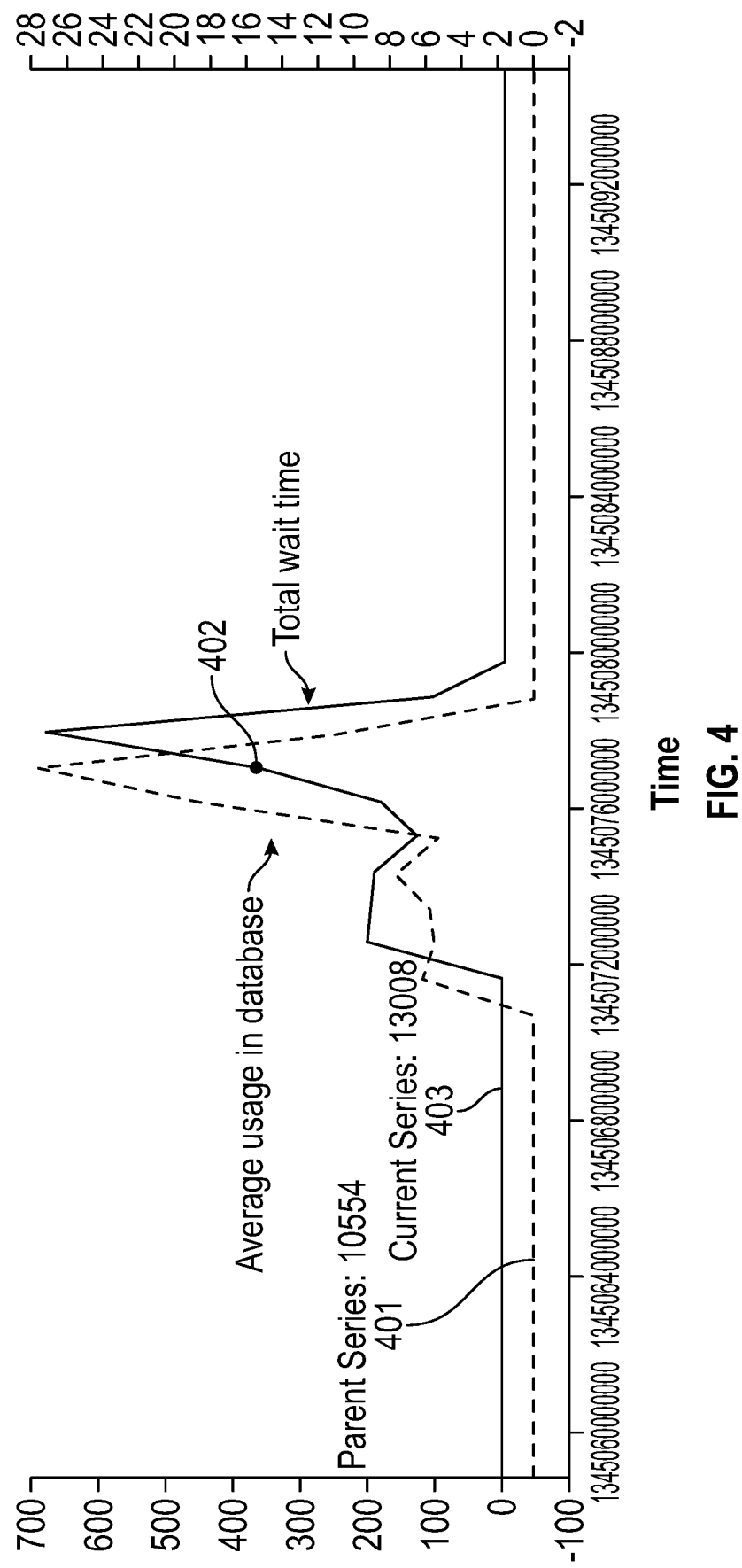
FIG. 4 is a graph of time-series data for alarm KPIs and their common root-cause KPIs chosen by a BP method according to some embodiments of the present invention.

More particularly, FIG. 4 illustrates examples of plots of time-series data for alarm KPIs and their common root-cause KPI 10554 selected by the BP method. The Y axes are merely exemplary for the value of the measured parameters (i.e., left axes corresponding to the average usage and the right axis corresponding to the total wait time). An exemplary time-series plot 400 is shown in FIG. 4, showing the selected root-cause 401 (i.e., parent series: 10554) and the anomalies/alarms detected at that time point 402 in a current series 403 (i.e., current series: 13008). It shows that the BP decision is correct, i.e., the anomalous behavior exhibited by the alarmed KPIs is preceded by some anomalous behavior in the common root cause KPI (i.e., 401). As well as being able to pick out root-causes for many alarms at a single timestamp, a BP according to some embodiments also detects potential root-causes over the course of a plurality of alarms for the same KPI.

Table I describes the average numbers (per time) of alarms and root-causes chosen by a BP method according to at least one embodiment of the present invention, on the first data set. It shows that a (max-product) BP method according to embodiments of the present invention consolidate alarms into significantly fewer root-causes, where the setting of the sparsity parameter λ in the OAC objective (12) is seen to affect the degree of reduction achieved.

TABLE I

|  | Avg. # of alarms | Avg. # of root-causes |
|---|---|---|
| λ = 1 | 11.394 | 8.976 |
| λ = 10 | 11.394 | 8.317 |
| λ = 100 | 11.394 | 7.816 |

Figure 8:
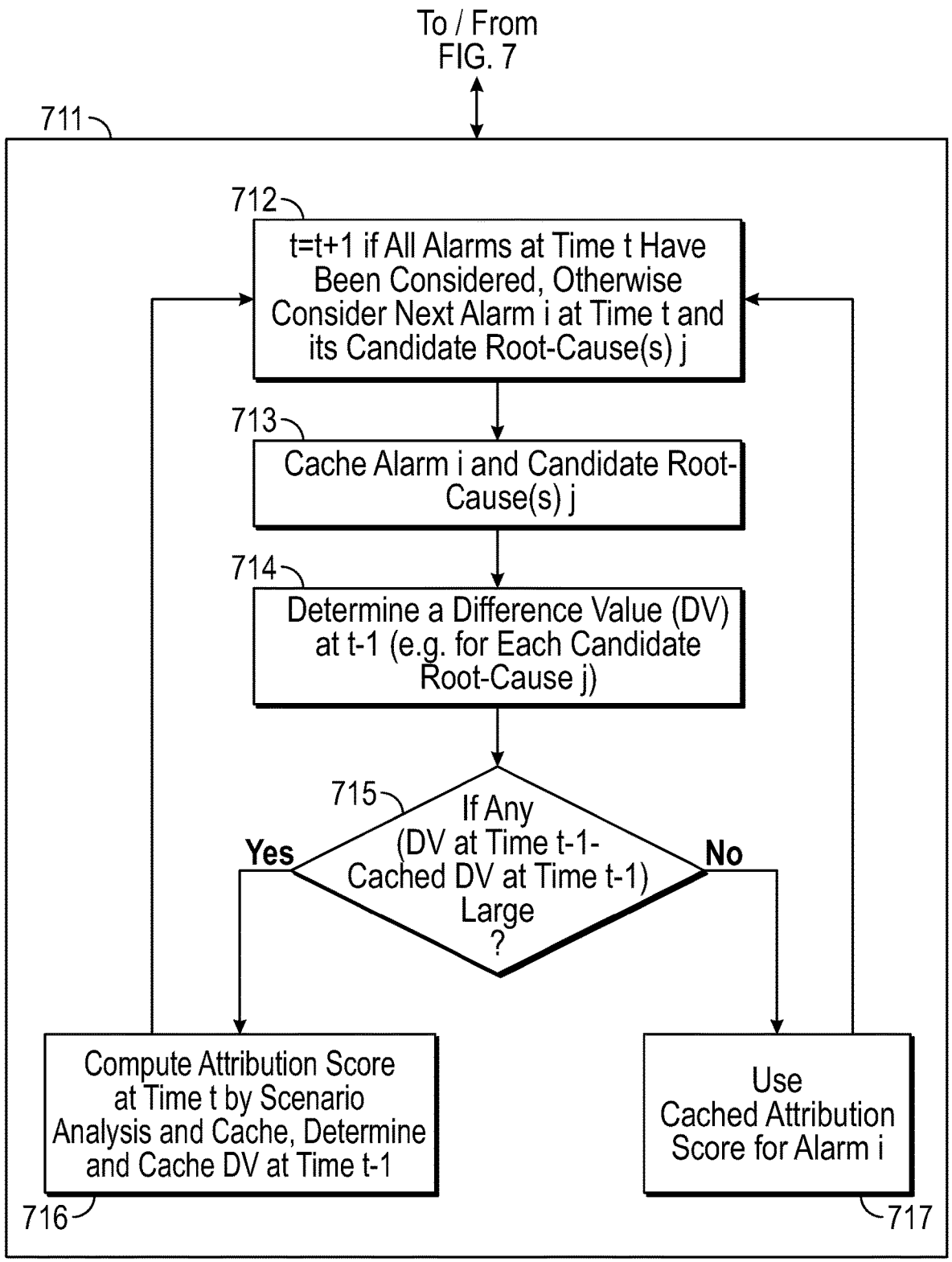
FIG. 8 depicts a flow diagram for a method for speeding alarm consolidation according to some embodiments of the present invention.

According to some embodiments, the speed of alarm consolidation is boosted via a cached scenario analysis (see 711, FIG. 8). Stated another way, some embodiments of the present invention reduce the number of scenario analyses to be run. According to at least one embodiment of the present invention, a BP method can reuse previous (e.g., cached) scenario analysis results.

According to some embodiments and to describe the technique, first note that $EX_i^Z(t)|$ can be obtained via a linear combination of 'single-ton' scenario analysis $EX_i^{e(i,j)}(t)-EX_i^O(t)$ due to (13). Motivated by this, for each alarm i and its candidate root-cause j 712, cache the alarm i and its candidate root-cause(s) j 713, and determine (e.g., for each candidate root-cause j) a difference between actual and predicted values of the candidate root-cause j (difference value –DV) at time t−1 714. The method further includes evaluating the attribution score $E_i^{e(i,j)}(t)-EX_i^O(t)$ 715, as:

$$EX_i^{e(i,j)}(t) - EX_i^0(t) = A_{ij}\overrightarrow{EX}_j(t-1) - A_{ij}\overrightarrow{X}_j(t-1)$$
$$= A_{ij}(\overrightarrow{EX}_j(t-1) - \overrightarrow{X}_j(t-1)).$$

Namely, the attribution score $EX_i^{e(i,j)}(t)-EX_i^O(t)$ is decided (i.e., whether to calculate a new attribution score or use a cached attribution score) by difference values $\overrightarrow{EX}_j(t-1)-\overrightarrow{X}_j(t-1)$. According to at least one embodiment, the value of $|\overrightarrow{EX}_j(t-1)-\overrightarrow{X}_j(t-1)|$ is cached during a previous iteration and calculation of the attribution score $EX_i^{e(i,j)}(t)-EX_i^O(t)$ (i.e., 716). Here, it should be understood that a difference value $\overrightarrow{EX}_j(t-1)-\overrightarrow{X}_j(t-1)$ is the difference between the expected (or average) value of $X_j$ at t−1 versus the actual value of $X_j$ at t−1 in the data. Now, if an alarm i occurs at a current timestamp t, the current value of $\overrightarrow{EX}_j(t-1)-\overrightarrow{X}_j(t-1)$ is compared with the cached value of $\overrightarrow{EX}_j(t-1)-\overrightarrow{X}_j(t-1)$ for each candidate root-cause j 715. Then, at 715, if the difference (with respect to the L1 norm) between them is small, for example, smaller than γ>0, then the cached $EX_i^{e(i,j)}(t)-EX_i^O(t)$ is reused, 717. Otherwise the attribution score is calculated for the current timestamp using the scenario analysis 716. Further, a difference value is determined for the t−1 timestamp and updated (e.g., in the cache) 716.

It should be understood that the method iterates through each of the alarms, which can be one or many time stamps, such that a current t is updated at 712 once all alarms at time t have been considered.

Furthermore, according to one embodiment, blocks 713-715 are iterated through, where successive candidate root-causes j of a current alarm i being considered are evaluated, and if any of the evaluations at block 715 are large, than the method proceeds to block 716 (potentially without evaluating all of the candidate root-causes j of the current alarm i), and block 717 otherwise. According to some embodiments, the difference value (DV) at block 715 is determined as a function of (e.g., a norm on) multiple difference values calculated for the candidate root-causes j of the current alarm i.

Table II shows reductions in the total running time results from an exemplary method of alarm consolidation using a cached scenario analysis, where γ=0 represents a baseline, i.e., not-using cached scenario analysis.

TABLE II

|  | Running time |
|---|---|
| γ = 0 (baseline) | 494 seconds |
| γ = 10 | 278 seconds |
| γ = 50 | 244 seconds |

Recapitulation:

Referring to FIG. 7, according to at least one embodiment of the present invention, a method 700 for anomaly alarm consolidation comprises receiving time-series data from an IT infrastructure 701, predicting a plurality of expected values of the time-series data 702 (e.g., using a VAR method to determining an average value of the time-series data, wherein the average value is used as the expected value), detecting alarms in the time-series data via a comparison with the expected values 703, identifying a plurality of root-cause candidates for each of the alarms via scenario analysis over the plurality of alarms and the historical values of the time-series data 704, and determining a reduced (i.e., minimized) set of root-causes by performing a belief propagation procedure between the plurality of root-cause candidates and the plurality of alarms, the reduced set of root-causes that collectively comprises attributed root causes for the plurality of alarms 705. According to some embodiments, the method further comprises outputting the root-causes common to the alarms 706. The output of a root-cause can be used by another process 707, for example, presented to a user, such as a system operator, via a user interface module to assist with their diagnostics of existing anomalies or anticipation of future anomaly risks, and to guide remedial and preventative actions, such as making changes in the system operations.

It should be understood that the belief propagation at block 705 can be a sum-product BP, a max-product BP, or another type of belief propagation configured to determine a set of root-causes, selection from among the root-cause candidates, attributed to the alarms.

Figure 9:
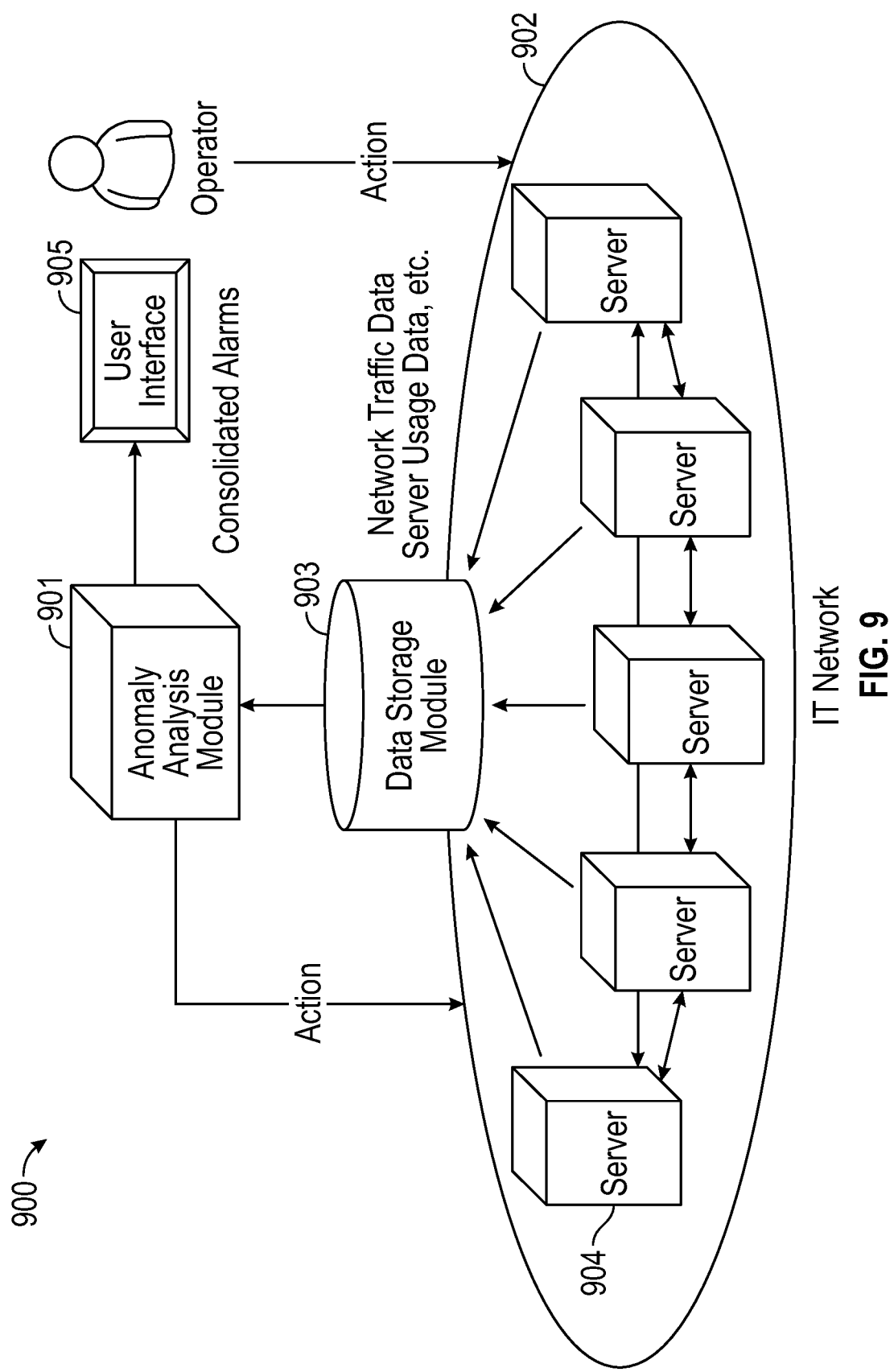
FIG. 9 depicts a system including an anomaly detection module 801 receiving data from an information technology (IT) network according to some embodiments of the present invention.

Referring to FIG. 9, according to some embodiments of the present invention, a system 900 includes an anomaly detection module 901 (executing on a computer—not shown) receiving data from an information technology (IT) network 902. The data can include real-time data and historical data (e.g., from a data storage module 903). The data can include network traffic data, sever usage data, etc. The IT network 902 comprises a plurality of servers, e.g., 904. According to at least one embodiment, the anomaly analysis module 901 outputs the consolidated alarms to a user interface module 905 of the computer or another computer, where an operator can diagnose anomalies, anticipate future anomalies, guide remedial and preventative actions, etc. According to some embodiments, the anomaly analysis module 901 determines that a certain root-cause is associated with an automatic action, and upon identifying the root-cause the anomaly analysis module 901 modifies the IT network 902 according to a predetermined action, for example, removing a server 904 from a cloud service provided by the IT network 902.

Embodiments of the present invention can be implemented in connection with a variety of IT infrastructures 902, including for example, self-driving vehicles, autonomous trading methods, sensor data output by an Internet of Things (IoT), application performance monitoring, transportation/shipping management, etc.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system implementing a method for anomaly alarm consolidation. Further, a computer program product can include a tangible computer-readable recordable storage medium with code adapted to be executed to carry out one or more method steps described herein, including the provision of the system with the distinct software modules.

Figure 10:
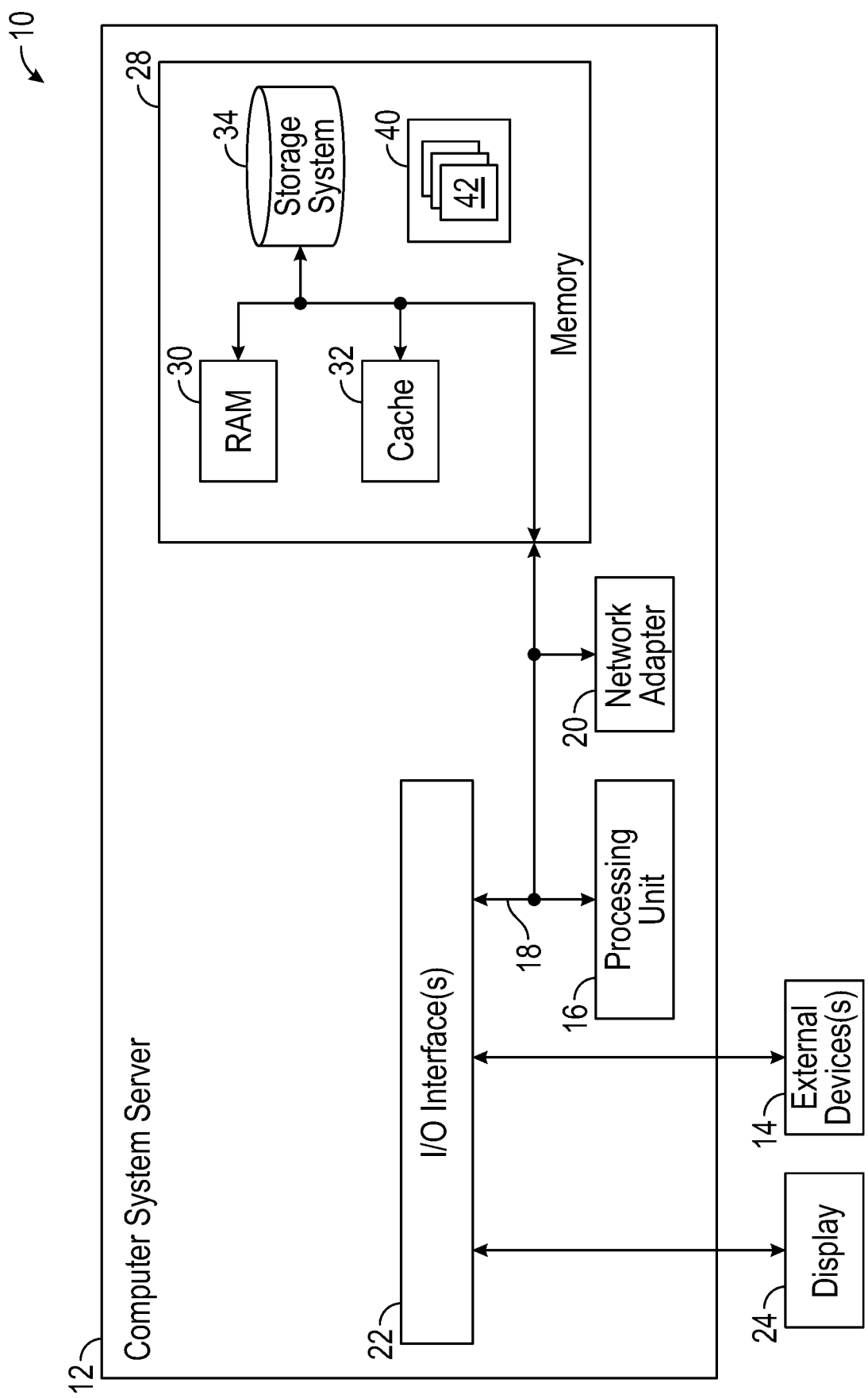
FIG. 10 is a block diagram depicting an exemplary computer system embodying a method of alarm consolidation, according to an exemplary embodiment of the present invention.

One or more embodiments of the invention, or elements thereof, can be implemented in the form of an apparatus including a memory and at least one processor that is coupled to the memory and operative to perform exemplary method steps. FIG. 10 depicts a computer system that may be useful in implementing one or more aspects and/or elements of the invention, also representative of a cloud computing node according to an embodiment of the present invention. Referring now to FIG. 10, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 10, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 10) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for anomaly alarm consolidation comprising:
   receiving, by a data storage module, time-series data from a plurality of sensors of an information technology infrastructure;
   detecting a plurality of anomalies in the time-series data stored in the data storage module;
   identifying a plurality of root-cause candidates for each of the anomalies;
   generating, by a scenario analysis of the anomalies, a plurality of alarms, wherein the scenario analysis predicts a plurality of future expected values of the time-series data over a plurality of historical values of the time-series data using a graphical Granger causal model and generates the alarms based on a difference between the future expected values of the time-series data and actual values of the anomalies in the time-series data;
   performing a belief propagation procedure between the root-cause candidates and the alarms to determine a plurality of root-causes that collectively comprise attributed root-causes for the alarms; and
   outputting the plurality of root-causes as a set of consolidated alarms,
   wherein the scenario analysis outputs an attribution score for each of the generated alarms paired with one of the root-cause candidates, the method further comprising:
   caching the attribution score for each respective pair of the alarms and the root-cause candidates;
   wherein the generating, by the scenario analysis of the anomalies, the alarms further comprises:
   using the cached anomaly attribution value cached for a subsequent alarm and root-cause candidate pair upon determining that a difference between the future expected value of the time-series data and the actual value of the anomaly in the time-series data corresponding to the respective pair of the alarms and the root-cause candidate corresponding to the cached anomaly attribution value is within a given threshold of a difference between a future expected value of the time-series data and an actual value of the anomaly in the time-series data corresponding to the subsequent alarm and root-cause candidate pair, without determining an attribution value by the scenario analyses for the subsequent alarm and root-cause candidate pair.

2. The method of claim 1, wherein each of the root-cause candidates is a set of the time-series data determined to likely cause at least one of the alarms.

3. The method of claim 1, wherein the belief propagation procedure comprises:
   determining a plurality of anomalous values of the root-cause candidates;
   replacing the anomalous values of the root-cause candidates with respective expected values; and
   determining a subset of the root-cause candidates, that using the respective expected values, reduces a level of anomalousness of at least one of the alarms, wherein the subset of the root-cause candidates defines the root-causes.

4. The method of claim 1, further comprising performing an optimization of the belief propagation procedure by balancing a minimization of a number of the plurality of root-causes for the alarms and a compromise in a quality of the attributed root-causes to the alarms.

5. A non-transitory computer readable storage medium comprising computer executable instructions which when executed by a computer cause the computer to perform a method for anomaly alarm consolidation comprising:
   detecting a plurality of anomalies in time-series data received from an information technology infrastructure;
   generating, by a scenario analysis of the anomalies, a plurality of alarms, wherein the scenario analysis predicts a plurality of future expected values of the time-series data over a plurality of historical values of the time-series data using a graphical Granger causal model and generates the alarms based on a difference between the future expected values of the time-series data and actual values of the anomalies in the time-series data;
   identifying a plurality of root-cause candidates of the alarms; and
   performing a belief propagation procedure between the root-cause candidates and the alarms to determine a plurality of root-causes that collectively comprise attributed root-causes for the alarms,
   wherein the scenario analysis outputs an attribution score for each of the generated alarms paired with one of the root-cause candidates, the method further comprising:
   caching the attribution score for each respective pair of the alarms and the root-cause candidates;
   wherein the generating, by the scenario analysis of the anomalies, the alarms further comprises:
   using the cached anomaly attribution value cached for a subsequent alarm and root-cause candidate pair upon determining that a difference between the future expected value of the time-series data and the actual value of the anomaly in the time-series data corresponding to the respective pair of the alarms and the root-cause candidate corresponding to the cached anomaly attribution value is within a given threshold of a difference between a future expected value of the time-series data and an actual value of the anomaly in the time-series data corresponding to the subsequent alarm and root-cause candidate pair, without determining an attribution value by the scenario analyses for the subsequent alarm and root-cause candidate pair.

6. The non-transitory computer readable storage medium of claim 5, wherein each of the root-causes candidates is a set of the time-series data determined to likely cause at least one of the alarms.

7. The non-transitory computer readable storage medium of claim 5, wherein the belief propagation procedure comprises:
   determining a plurality of anomalous values of the root-cause candidates;
   replacing the anomalous values of the root-cause candidates with respective expected values; and
   determining a subset of the root-cause candidates, that using the respective expected values, reduces a level of anomalousness of at least one of the alarms, wherein the subset of the root-cause candidates defines the root-causes.

8. The non-transitory computer readable storage medium of claim 5, further comprising performing an optimization of the belief propagation procedure by balancing a minimization of a number of the plurality of root-causes for the alarms and a compromise in a quality of the attributed root-causes to the alarms.

* * * * *